United States Patent
Huang et al.

(10) Patent No.: US 7,507,437 B2
(45) Date of Patent: Mar. 24, 2009

(54) METHOD OF WET COATING FOR APPLYING ANTI-REFLECTIVE FILM TO SUBSTRATE

(75) Inventors: Chi-shu Huang, Taichung (TW); Hsing-ya Liu, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 460 days.

(21) Appl. No.: 11/197,373

(22) Filed: Aug. 5, 2005

(65) Prior Publication Data
US 2007/0020388 A1    Jan. 25, 2007

(30) Foreign Application Priority Data
Sep. 2, 2004   (TW) ............... 93126511 A

(51) Int. Cl.
*B05D 5/06* (2006.01)
(52) U.S. Cl. ............ 427/162; 427/402; 427/372.2; 427/430.1; 427/240; 427/421.1
(58) Field of Classification Search ............ 427/162, 427/402, 372.2, 430.1, 240, 421.1
See application file for complete search history.

(56) References Cited

U.S. PATENT DOCUMENTS

| | | | |
|---|---|---|---|
| 3,958,970 A * | 5/1976 | Auzel | 65/33.3 |
| 4,830,879 A * | 5/1989 | Debsikdar | 427/162 |
| 5,308,648 A * | 5/1994 | Prince et al. | 427/212 |
| 5,578,410 A | 11/1996 | Petropoulos et al. | |
| 5,619,288 A * | 4/1997 | White et al. | 351/159 |
| 5,633,046 A | 5/1997 | Petropoulos et al. | |
| 5,681,391 A | 10/1997 | Mistrater et al. | |
| 5,693,372 A | 12/1997 | Mistrater et al. | |
| 5,699,189 A * | 12/1997 | Murphy | 359/601 |
| 5,965,210 A | 10/1999 | Tada et al. | |
| 6,172,812 B1 | 1/2001 | Haaland et al. | |
| 2005/0196618 A1 * | 9/2005 | Knox et al. | 428/414 |

\* cited by examiner

*Primary Examiner*—Alain L Bashore

(57) ABSTRACT

A method of wet coating for applying an anti-reflective film to a substrate comprises the following steps: (1) providing and cleaning a substrate; (2) preparing a coating solution comprised of a highly volatile solvent and a film-forming compound dissolved in the highly volatile solvent; (3) coating the substrate homogeneously with the above coating solution at normal temperature and confirming complete evaporation of the liquid on the substrate at normal temperature to finish a single layer coating without thermal treatment; and (4) repeating the above coating step as required to obtain a desired number of layers.

20 Claims, 3 Drawing Sheets

METHOD OF WET COATING FOR APPLYING ANTI-REFLECTIVE FILM TO SUBSTRATE

BACKGROUND OF THE INVENTION

1. Field of the Invention

The present invention relates to a coating method, and particularly relates to a method of wet coating for applying an anti-reflective film to a substrate.

2. Description of Prior Art

It is well known that, all uncoated, optically transparent materials reflect a portion of incident light. To increase the light transmission and thus reduce the reflection loss, appropriate interference layers are applied. The surface to be subjected to antireflection treatment is coated with one or several thin layers having a suitable refractive index and an appropriate thickness. The structure of the interference layer is so configured that destructive interference phenomena occur in the reflected radiation field in suitable wavelength ranges, so that reflexes from light sources are strongly reduced in terms of their brightness. A single quarter-wavelength coating of optimum index can eliminate reflection at one wavelength. Multi-layer coatings can reduce the loss over the visible spectrum.

Two widely used anti-reflective (AR) coating methods are physical vapor deposition (PVD) and chemical vapor deposition (CVD). PVD includes methods of evaporation, sputtering, molecular beam epitaxy, and vapor phase epitaxy. PVD operates by changing a solid material to a vapor in a deposition chamber and allowing the vapor to condense on a substrate. However, in PVD process, the interface between the substrate and film is generally distinct, which in many cases produces poor relative adhesion, and thus may induce frilling and even peeling of the film. With the continuing trend of an optical substrate toward small size and large curvature, the possibility of frilling and even peeling of the film formed by the PVD process from the substrate increases, since the surface effect increases with reduced size and increased curvature. Further, the implementation of PVD process requires complicated apparatus. The high cost to purchase, operate, and maintain the apparatus, restricts its application to central production facilities. The evaporative method also causes heating of the substrate because convective cooling is inefficient in a vacuum and the hot elemental materials emit thermal radiation that may be absorbed by the substrate. The heating can cause substrate damage, such as internal stress and warping, especially with plastic substrates.

CVD process is another deposition process that produces a non-volatile solid film on a substrate by the surface pyrolized reaction of gaseous reagents that can contain the desired film constituents. However, the CVD process is carried out at a higher temperature than PVD, and typically heats the substrate in a range from 500 degrees Centigrade to 1600 degrees Centigrade. Such high temperature deposition causes progressive interfacial diffusion and the formation of pores, fractures and the intermetallic phase in the interfacial region, thereby significantly decreasing film adhesion. Therefore, the main disadvantage of the CVD process is the relatively high substrate temperature that is needed. High temperature in general requires that the coefficient of thermal expansion of the substrate and the coating must be matched, or else excessive strains are introduced into the coating. This is particularly advantageous in the coating of temperature-sensitive plastic substrates, thereby limiting the kind of substrates that can be coated by CVD process.

The sol-gel method is also known as an AR film coating method. Sol-gel is a useful method for the deposition coatings of oxide materials. Pre-cursors containing the element whose oxide is to be deposited are reacted in a solvent medium with water. Hydrolysis and condensation reactions proceed to generate colloidal dispersions of the oxide. These dispersions can be used to deposit oxide coatings by dip, spin or spray coating methods. Once deposited onto a substrate, thermal treatment of the substrate converts the colloidal particles into a compact mechanically sound oxide layer. Since thermal treatment is required, this method is also not suitable for temperature-sensitive plastic substrates. Furthermore, with the dip coating process, there is a tendency that coating solution flows down due to gravity after the substrate is withdrawn from the coating bath, which makes the thickness gradually increase from the top to the bottom. This is known as a coating "wedge". This is especially noticeable in the case where the coating solution has very low viscosity and the coating process has high withdrawal speed. Related dip coating methods and apparatus are disclosed in U.S. Pat. Nos. 5,693,372; 5,681,391; 5,578,410; 5,633,046 and 5,965,210, the disclosures of which are incorporated herein by reference.

It is, therefore, desirable to provide a method for coating AR films with uniform thickness and strong adhesion that only requires compact, inexpensive device and can be performed at normal temperature to avoid heat damage.

SUMMARY OF THE INVENTION

One object of the present invention is to provide a method of wet coating for applying an anti-reflective film to a substrate, the method being performed at normal temperature without thermal treatment, which is suitable for various kinds of substrates including plastic substrates.

Another object of the present invention is to provide a method of wet coating for applying an anti-reflective film to a substrate, the method producing a film with uniform thickness and strong adhesion to the substrate, which is especially suitable for small size, large curvature and irregularly shaped substrates.

A further object of the present invention is to provide a method of wet coating for applying an anti-reflective film to a substrate, which only requires compact, inexpensive device, thereby significantly decreasing cost.

To achieve the above objects, a method of wet coating for applying an anti-reflective film to a substrate in accordance with the present invention comprises the following steps: (1) providing and cleaning a substrate; (2) preparing a coating solution comprised of a highly volatile solvent and a film-forming compound dissolved in the highly volatile solvent; (3) coating the substrate homogeneously with the above coating solution at normal temperature and confirming complete evaporation of the liquid on the substrate at normal temperature to finish a single layer coating without thermal treatment; and (4) repeating the above coating step as required to obtain a desired number of layers.

The film-forming compound in the coating solution includes inorganic oxides, nitrides, sulphides, selenides or fluorides to achieve a reduction in reflection. The coating step (3) may be performed by dipping, where the substrate is immersed in the coating solution for a period of time, and then separated from the coating solution by withdrawing the substrate or lowering the level of the coating solution surface. When the withdrawing method is applied, the substrate is held by a carrying device such as a basket, and is immersed in the coating solution and pulled up by means of a motor descending and ascending at a constant rate. The withdrawal rate of the substrate from the coating solution is controlled in such a manner that the liquid on the substrate surface completely evaporates as soon as the substrate separates from the coating solution surface.

The coating step (3) may also be performed by spinning, where the substrate is attached to a turntable and rotated at a predetermined speed. The coating solution is poured on the center of the substrate, such that the centrifugal force spreads out the solution over the entire surface of the substrate to produce a uniform coating.

The coating step (3) may also be performed by spraying, where the substrate is held at the edges and the coating solution is either drained away at a constant rate or sprayed with a gun having high atomizing capacity.

The coating step (3) may further be performed by spreading, where the coating solution is directly applied to the substrate by a movable tool.

BRIEF DESCRIPTION OF THE DRAWINGS

The present invention may best be understood through the following description with reference to the accompanying drawings, in which.

DETAILED DESCRIPTION OF THE INVENTION

Figure 1:
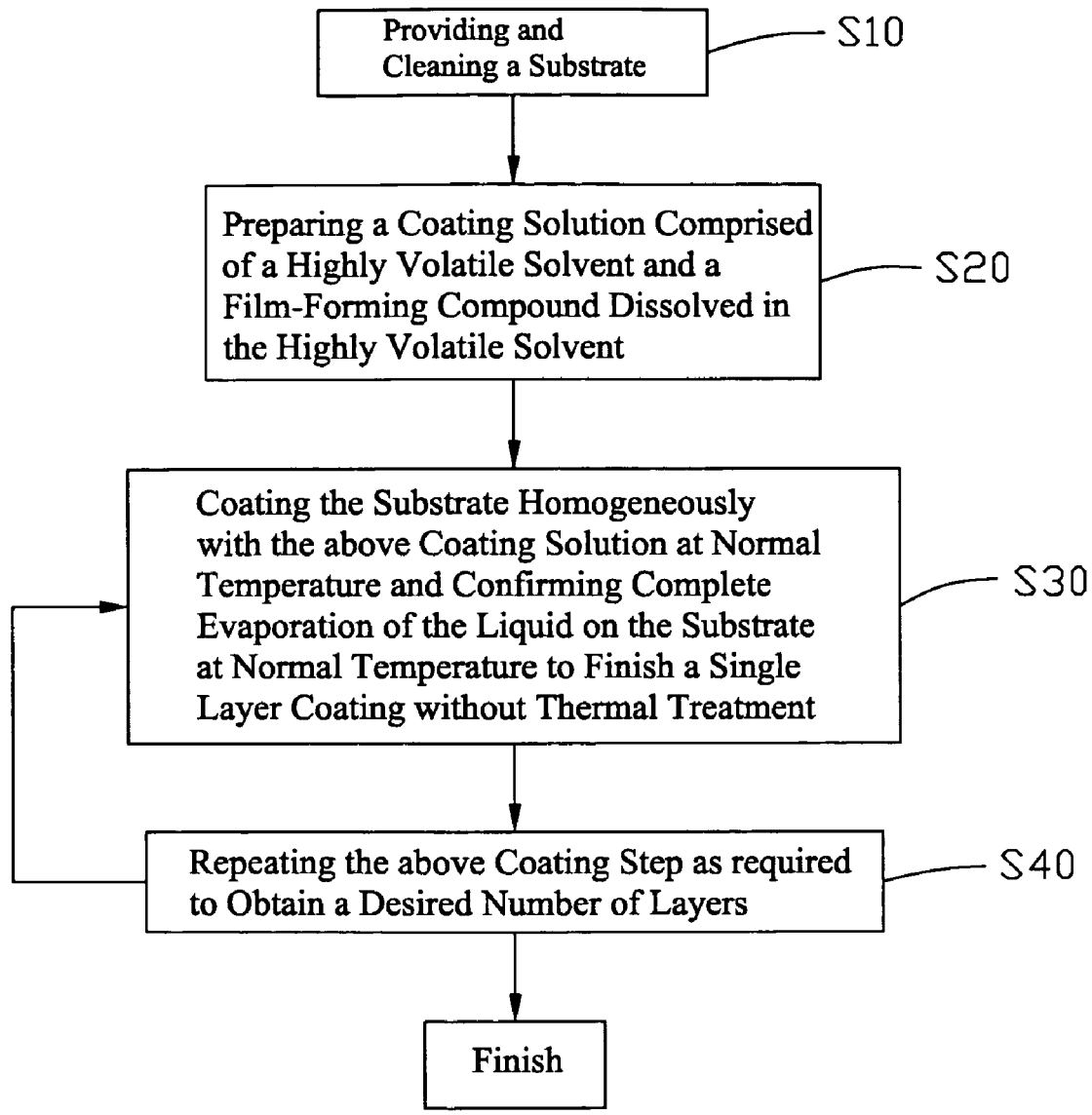
FIG. 1 is a flow chart illustrating the steps of the present method of wet coating for applying an anti-reflective film to a substrate.

A method of wet coating for applying an anti-reflective film to a substrate in accordance with the present invention comprises several sequential steps as designated by S10~S40 in FIG. 1. Step S10: providing and cleaning a substrate, such as an optical substrate that includes plastic and glass substrates. Step S20: preparing a coating solution comprised of a highly volatile solvent and a film-forming compound dissolved in the highly volatile solvent. Step S30: coating a film homogeneously on the substrate from the above coating solution at normal temperature, and confirming complete evaporation of the liquid on the substrate at normal temperature to finish a single layer coating without thermal treatment. Step S40: repeating the above coating step as required to obtain a desired number of layers. After performing the above steps, the coating process is finished.

In step S10, the substrate to be coated may be cleaned with detergents, ultrasonic wave energy, ion bombarding, and so on, so as to ensure thorough cleaning and uniform wetting. From the point of cost, cleaning with detergents is preferred. After cleaning with detergent, alcohol and deionised water rinses are followed. Alternatively, the substrate may also be washed with a warm soap solution or an alkaline solution.

In step S20, the film-forming compound in the coating solution includes inorganic oxides, nitrides, sulphides, selenides or fluorides to achieve a reduction in reflection. Solid fluorides are preferred that include fluorides of Bi, Ca, Ce, Na, Pb, Li, Mg, Nd, La or Th. Various compounds for an AR coating are disclosed in U.S. Pat. No. 6,172,812, the disclosure of which is incorporated herein by reference. The highly volatile solvent in the coating solution includes those well known in the art that are highly volatile at normal temperature, such as supercritical Carbon dioxides ($SCCO_2$).

The coating step S30 may be preferably performed by dipping. The dipping process may include the following components: a bath of coating solution, allowing the coating solution to fill to the top edge; a carrying device capable of holding the substrate during the dipping process; a mechanism capable of dipping the substrate; a control system to control the speed and position of the substrate during the dipping process. A motor and a Programmable Logic Controller system can be used for the controlling purpose. In the dipping process, the substrate is immersed into the bath of the coating solution. After leaving stationary for a period of time, to allow the interface between the substrate and solution to equilibrate, the substrate is then separated from the bath by withdrawing the substrate or lowering the level of the coating solution surface. This process results in the deposition of a thin film of compound particles on the substrate's surface.

When the withdrawing method is applied, the substrate is held by a carrying device such as a basket. The substrate together with the carrying device is immersed in the coating solution and pulled up by means of a motor descending and ascending at a constant rate. The constant rate at which the motor descends and ascends is set according to the material, the surface roughness, the shape, the surface area and the surface curvature of the substrate. If the surface roughness and surface area of the substrate are large, or the substrate is irregularly shaped, the descending and ascending speed of the motor should be decreased. The motor speed is controlled in such a manner that the liquid on the substrate surface completely evaporates as soon as the substrate separates from the coating solution surface. Consequently, traces of water left on the substrate surface due to air-drying can be effectively prevented, and the coating with a nonuniform thickness as present in the prior art can also be avoided.

The carrying device is adapted for holding the substrate during the descending and ascending processes, thereby preventing fall of the substrate. The design of the carrying device should satisfy the requirements of both holding the substrate and preventing the occurrence of a nonuniform coating on the substrate surface. To satisfy these requirements, both the immersion angle and direction of the substrate into the coating solution should be considered. The immersion angle and direction of the substrate into the coating solution are determined by the material, the surface roughness, the shape, the surface area and the surface curvature of the substrate.

After the substrate is separated from the coating solution, and it is further confirmed that at normal temperature evaporation of the liquid on the substrate is complete, a single layer coating on the substrate without thermal treatment has thus been obtained. If desired, as designated by step S40, the substrate held by the carrying device may be repeatedly immersed into the coating solution until the desired number of layers and the desired reflectance properties of the AR coating are obtained. The number of times to repeat immersion, or the immersing frequencies, of the substrate into the coating solution are defined by the factors including the material, the surface roughness, the shape, the surface area and the surface curvature of the substrate; the coating solution concentration, the solute compound, the solvent content; the desired AR band; and the immersion time of the substrate in the coating solution. If the surface roughness, surface area or surface curvature of the substrate are large, or the substrate is irregularly shaped, the number of immersion times should be increased. In case of a given solute compound and a given solvent content, the higher the coating solution concentration, the less the number of immersion times. If the desired AR band is broad, the number of immersion times should be increased. If the immersion time of the substrate in the coating solution is long, the number of immersion times should be decreased.

Figure 2:
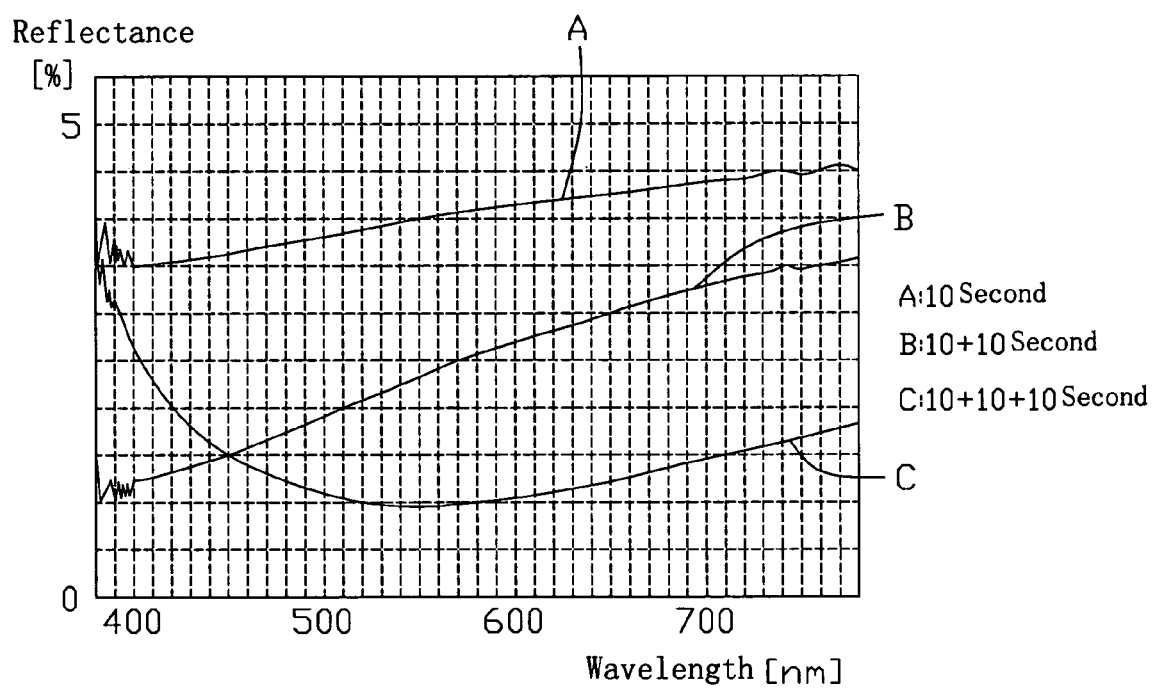
FIG. 2 is a diagram showing reflectance properties of AR coatings applied to a plastic substrate by the present method of wet coating with a given coating solution but at different immersing frequencies.

FIG. 2 is a diagram showing reflectance properties of AR coatings applied to a plastic substrate by the above dip coating method with a coating solution of a given concentration but at different immersing frequencies. The relation between the reflectance properties (%) of the obtained coatings and the wavelength (nm) is shown. It can be observed that, in case of a coating solution of a given concentration, when the plastic substrate is immersed in the coating solution for 10 seconds each time, the obtained reflectance curves A, B and C, respectively corresponding to a one-time immersion (10 seconds), a two-time immersion (10+10 seconds) and a three-time immersion (10+10+10 seconds), exhibit decreased reflectance in order. That is, the reflectance properties obtained by the three-time immersion are the best, with the reflectance being approximately in the range of 1-2% in the visible spectrum (400-760 nm).

Figure 3:
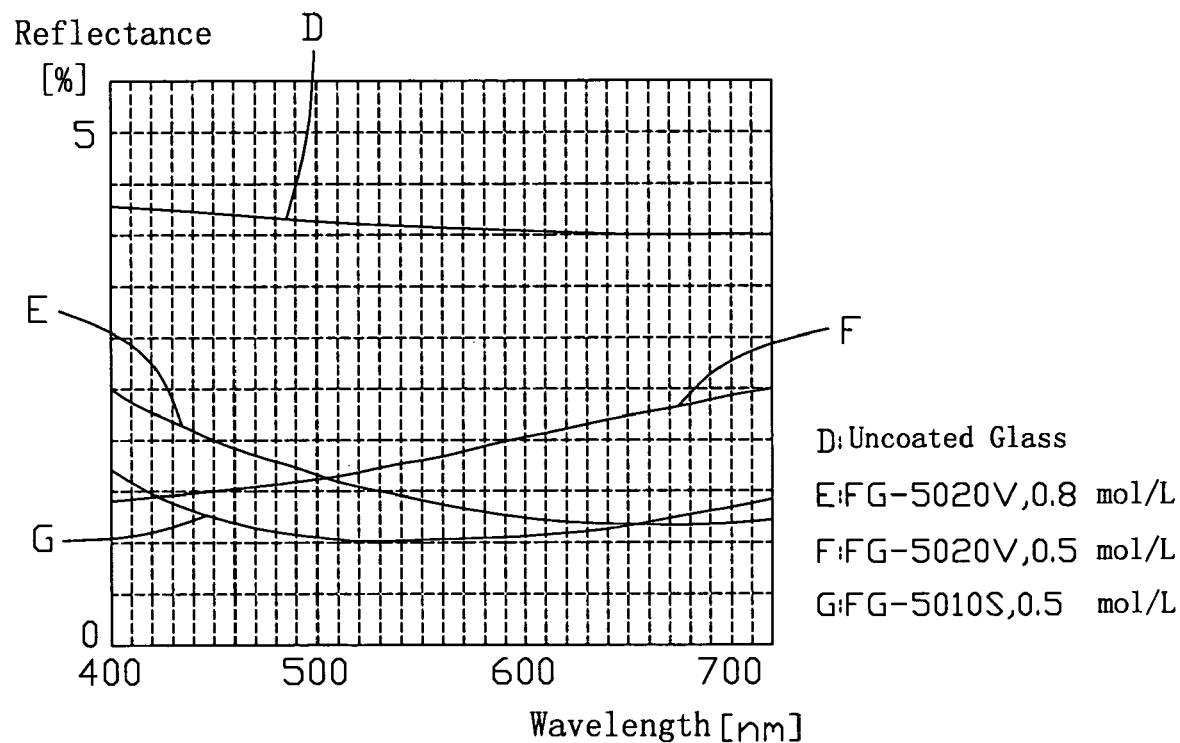
FIG. 3 is a diagram showing reflectance properties of AR coatings applied to a glass substrate by the present method of wet coating for a fixed immersing period but with coating solutions of different concentration.

FIG. 3 is a diagram showing reflectance properties of AR coatings applied to a glass substrate by the above dip coating method for a fixed immersion period but with coating solutions of different concentration. The relation between the reflectance properties (%) of the obtained coatings and the wavelength (nm) is shown. Also illustrated are the differences in reflectance properties of coated and uncoated glass substrates. As shown by curve D in FIG. 3, before applying coating, glasses with a refractive index of typically 1.52 reflect 4-5% of incident light in the visible range at each surface. It can be observed that, after coating, the reflectance is significantly decreased, which is illustrated by curves E, F, and G. In case of the same immersion time and the same coating solution content, by comparing curve E (with a solution concentration of 0.8 mol/L) and curve F (with a solution concentration of 0.5 mol/L), it can be seen that, in the visible range, the reflectance of the obtained coating generally decreases with the increase of the solution concentration. Noticeably, however, in a specific visible range of 400-500 nm that is adjacent to the near ultraviolet band, curve F generally exhibits lower reflectance than that of curve E. Accordingly, the selection of the solution concentration should also depend on the desired AR band. Curve G (with a solution concentration of 0.5 mol/L) is measured by applying a coating solution with the solution content different from curves E and F, but with the same immersion time. In comparison with curve F, curve G generally exhibits a low reflectance in the visible range. This illustrates that, in addition to the solution concentration, the solution content also affect the reflectance properties of the obtained AR coatings.

In addition to the above dip coating method, other similar methods, which apply a coating solution to the substrate to obtain a film by evaporation so as to achieve the same AR effects, may also be employed to implement the present invention. These methods include, but are not limited to, spinning, spraying and spreading.

In the spinning process, the substrate is attached to a turntable and rotated at a predetermined speed. The coating solution is poured on the center of the substrate, preferably by means of a pipette, such that the centrifugal force spreads out the solution over the entire surface of the substrate to produce a uniform coating. The rotation speed of the turntable (or the substrate), and the concentration, the content and the volume of the coating solution generally determine the AR effect of the resulting coating. After the liquid of the coating solution on the substrate rapidly evaporates at normal temperature, the coating is accomplished. The thickness of the resulting coating is generally determined by the rotation speed of the turntable and viscosity of the coating solution. The thickness of the resulting coating decreases with the increase of the rotation speed and the decrease of the solution viscosity. By this spinning process, very homogeneous coating thickness can be obtained even with non-planer substrates, since the liquid of the coating solution on the substrate can rapidly evaporate at normal temperature due to the provision of a highly volatile solvent. However, this process is limited to substrates with a rotational symmetry, e.g. optical lenses or eyeglass lenses.

In the spraying process, the substrate is held at the edges and the coating solution is either drained away at a constant rate or sprayed with a gun having high atomizing capacity. The concentration, the content, the volume and the evaporation rate of the coating solution generally determine the AR effect of the resulting coating. Coating by spraying offers several advantages. The waste of coating solution is much smaller compared to the dip coating, coating solution with rather short pot lives can be used, and the coating step is suitable for forming a layer of large area and for coating an irregularly shaped substrate. In this process, the coating thickness is influenced by the draining rate of the coating solution over the surface of the substrate, the viscosity of the coating solution and the solute content.

In the spreading process, the coating solution is directly applied to the substrate by a movable tool, such as a brush or a roller. The concentration, the content, the volume and the evaporation rate of the coating solution generally determine the AR effect of the resulting coating.

As described above, the present method of wet coating for applying an anti-reflective film to a substrate can be implemented at normal temperature. After evaporation of the coating solution, the film-forming compound particles are adhered to the substrate surface to directly form a layer without requiring conventional thermal treatment. Accordingly, the present method of wet coating is applicable to various substrates, such as temperature-sensitive plastic substrates, irregularly shaped substrates, and substrates having instable surface energy that tend to induce frilling and even peeling of the resulting film.

The present method of wet coating is implemented by directly applying a coating solution to the substrate. Therefore, the film production is significantly facilitated, and the mass production stability and yield are increased. A uniform AR film may be obtained by the present method of wet coating, and frilling and even peeling of the resulting film will not be induced even for a substrate of a small size. The resulting film by the present method of wet coating has past tests including cold and thermal impact, constant temperature and constant humidity tests.

Further, in addition to cleaning, no additional treatment is required for the substrate. The present method of wet coating only requires compact, inexpensive device, thereby significantly decreasing cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wet coating method for applying an anti-reflective film to a substrate comprises the following steps:

(1) providing and cleaning a substrate;

(2) preparing a coating solution comprised of a volatile solvent and an anti-reflective film-forming compound dissolved in the volatile solvent;

(3) coating the substrate homogeneously with the coating solution at normal temperature and confirming complete evaporation of the volatile solvent of the coating solution on the substrate at normal temperature to finish a single anti-reflective layer coating without thermal treatment; and (4) repeating the coating step as required to obtain a desired number of anti-reflective layers without any post heat treatment.

2. The wet coating method as claimed in claim 1, wherein the anti-reflective film-forming compound in the coating solution includes inorganic oxides, nitrides, sulphides, selenides or fluorides.

3. The wet coating method as claimed in claim 1, wherein the anti-reflective film-forming compound in the coating solution is solid fluoride.

4. The wet coating method as claimed in claim 3, wherein the solid fluoride include fluoride of Bi, Ca, Ce, Na, Pb, Li, Mg, Nd, La or Th.

5. The wet coating method as claimed in claim 1, wherein the coating step is performed by dipping, where the substrate is immersed in the coating solution for a period of time and then separated from the coating solution by withdrawing the substrate or lowering the level of the coating solution surface.

6. The wet coating method as claimed in claim 5, wherein, when the withdrawing method is applied, the substrate is held by a carrying device and is immersed in the coating solution and pulled up by means of a motor descending and ascending at a constant rate.

7. The wet coating method as claimed in claim 6, wherein the withdrawal rate of the substrate from the coating solution is controlled in such a manner that the volatile solvent of the coating solution on the substrate surface completely evaporates as soon as the substrate separates from the coating solution surface.

8. The wet coating method as claimed in claim 1, wherein the coating step is performed by spinning.

9. The wet coating method as claimed in claim 1, wherein the coating step is performed by spraying.

10. The wet coating method as claimed in claim 1, wherein the coating step is performed by spreading, where the coating solution is directly applied to the substrate by a movable tool.

11. The wet coating method as claimed in claim 1, wherein each layer of the resulting coating is formed with the same coating solution.

12. The wet coating method as claimed in claim 1, wherein the substrate is an optical substrate.

13. The wet coating method as claimed in claim 1, wherein the volatile solvent in the coating solution is supercritical carbon dioxide ($SCCO_2$).

14. A wet coating method for applying an anti-reflective film to a substrate comprises the following steps:

(1) providing and cleaning a substrate;

(2) preparing a coating solution comprised of a volatile solvent and an anti-reflective film-forming compound dissolved in the volatile solvent;

(3) immersing the substrate into the coating solution for a period of time at normal temperature;

(4) separating the substrate from the coating solution at a predetermined rate, the rate being controlled in such a manner that the volatile solvent of the coating solution on the substrate surface completely evaporates at normal temperature as soon as the substrate separates from the coating solution surface, whereby a single anti-reflective layer coating is finished without thermal treatment; and (5) repeating the immersing and separating steps as required to obtain a desired number of anti-reflective layers.

15. The wet coating method as claimed in claim 14, wherein the anti-reflective film-forming compound in the coating solution is solid fluoride.

16. The wet coating method as claimed in claim 14, wherein the separating step is implemented by withdrawing the substrate from the coating solution or by lowering the level of the coating solution surface.

17. The wet coating method as claimed in claim 16, wherein, when the withdrawing method is applied, the substrate is held by a carrying device and is immersed in the coating solution and pulled up by means of a motor descending and ascending at a constant rate.

18. The wet coating method as claimed in claim 14, wherein each layer of the resulting coating is formed with the same coating solution.

19. The wet coating method as claimed in claim 14, wherein the substrate is an optical substrate.

20. The wet coating method as claimed in claim 19, wherein the optical substrate include a plastic lens or a glass lens.

* * * * *